(12) United States Patent
Li

(10) Patent No.: US 8,982,054 B2
(45) Date of Patent: Mar. 17, 2015

(54) KEYBOARD HAVING INFRARED POSITION DETECTION APPARATUS AND INPUT METHOD USING SAME

(71) Applicant: Cheng-Zhi Li, Guangdong (CN)

(72) Inventor: Cheng-Zhi Li, Guangdong (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 183 days.

(21) Appl. No.: 13/663,588

(22) Filed: Oct. 30, 2012

(65) Prior Publication Data

US 2013/0314324 A1 Nov. 28, 2013

(30) Foreign Application Priority Data

May 22, 2012 (CN) .......................... 2012 1 0159228

(51) Int. Cl.
*G06F 3/02* (2006.01)
*G06F 3/023* (2006.01)

(52) U.S. Cl.
CPC . *G06F 3/02* (2013.01); *G06F 3/023* (2013.01)
USPC .......................................................... 345/168

(58) Field of Classification Search
CPC ............ G09G 5/00; G09G 5/08; G06F 3/033; G06F 3/02; G06F 3/041; G06F 3/045
USPC ................... 345/156–175; 178/18.01–18.06
See application file for complete search history.

(56) References Cited

U.S. PATENT DOCUMENTS

| | | | | |
|---|---|---|---|---|
| 4,420,261 A | * | 12/1983 | Barlow et al. | 356/621 |
| 4,980,547 A | * | 12/1990 | Griffin | 250/221 |
| 6,153,836 A | * | 11/2000 | Goszyk | 178/19.01 |
| 6,927,386 B2 | * | 8/2005 | Iwamoto et al. | 250/221 |
| 2001/0002694 A1 | * | 6/2001 | Nakazawa et al. | 250/221 |
| 2010/0259507 A1 | * | 10/2010 | Yen et al. | 345/175 |
| 2012/0293461 A1 | * | 11/2012 | Choi | 345/175 |

* cited by examiner

*Primary Examiner* — Pegeman Karimi
(74) *Attorney, Agent, or Firm* — Novak Druce Connolly Bove + Quigg LLP

(57) ABSTRACT

A keyboard includes an input interface, a rotatable infrared emitter, a first counter, a second counter, an infrared receiver, and a processor. The rotatable infrared emitter emits infrared light across the input interface which represents a keyboard. The first counter starts a count at each beginning of the infrared light emission. The second counter starts a count when the infrared emitter rotates to reach a reference direction in each rotating period. The infrared receiver stops the counts of the first counter and the second counter when the infrared receiver receives infrared light reflected from an obstacle. The first counter defines a transmission time of the infrared light. The second counter defines a rotating time. The processor calculates a position of the obstacle on the input interface according to the transmission time, the rotating time, a rotating speed of the infrared emitter, and positions of the infrared emitter and infrared receiver.

20 Claims, 5 Drawing Sheets

US 8,982,054 B2

KEYBOARD HAVING INFRARED POSITION DETECTION APPARATUS AND INPUT METHOD USING SAME

TECHNICAL FIELD

Embodiments of the present disclosure relate to a keyboard and an input method using the same.

DESCRIPTION OF RELATED ART

Computer keyboards are well known, and typically consist of a flat, generally rectangular rigid "slab" bearing one hundred or more keys, such as standard letter keys, number keys, punctuation keys, function keys, and the like. However, such keyboards normally have great volume and are inconvenient from a portability point of view or when placed in a limited space.

Thus, a need to overcome the above-described shortcomings is desired.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of a non-transitory computer-readable medium include compact discs (CDs), digital video discs (DVDs), BLU-RAY disks, Flash memory, and hard disk drives.

Figure 1:
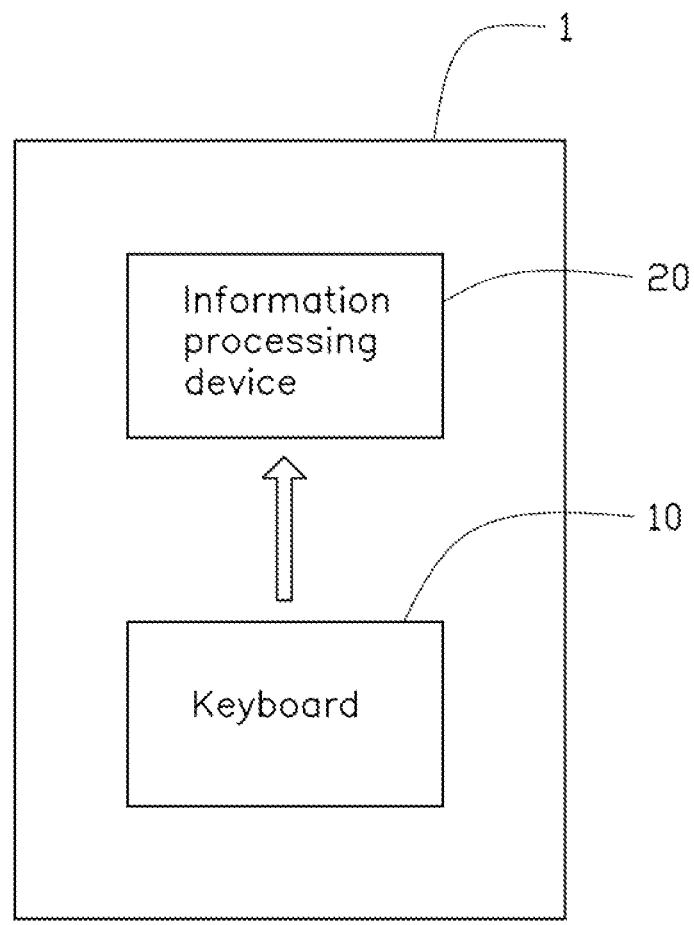
FIG. 1 is an employing environment of a keyboard system of one embodiment of present disclosure.

Referring to FIG. 1, an employing environment of a keyboard 10 of one embodiment of present disclosure is shown. The keyboard 10 may be used as an input device. The input may be transmitted to an information processing device 20 by the keyboard 10. In one embodiment, the information processing device 20 may be selected from a group consisting of personal computers, portable computers, tablet computers, and smart phones.

Figure 2:
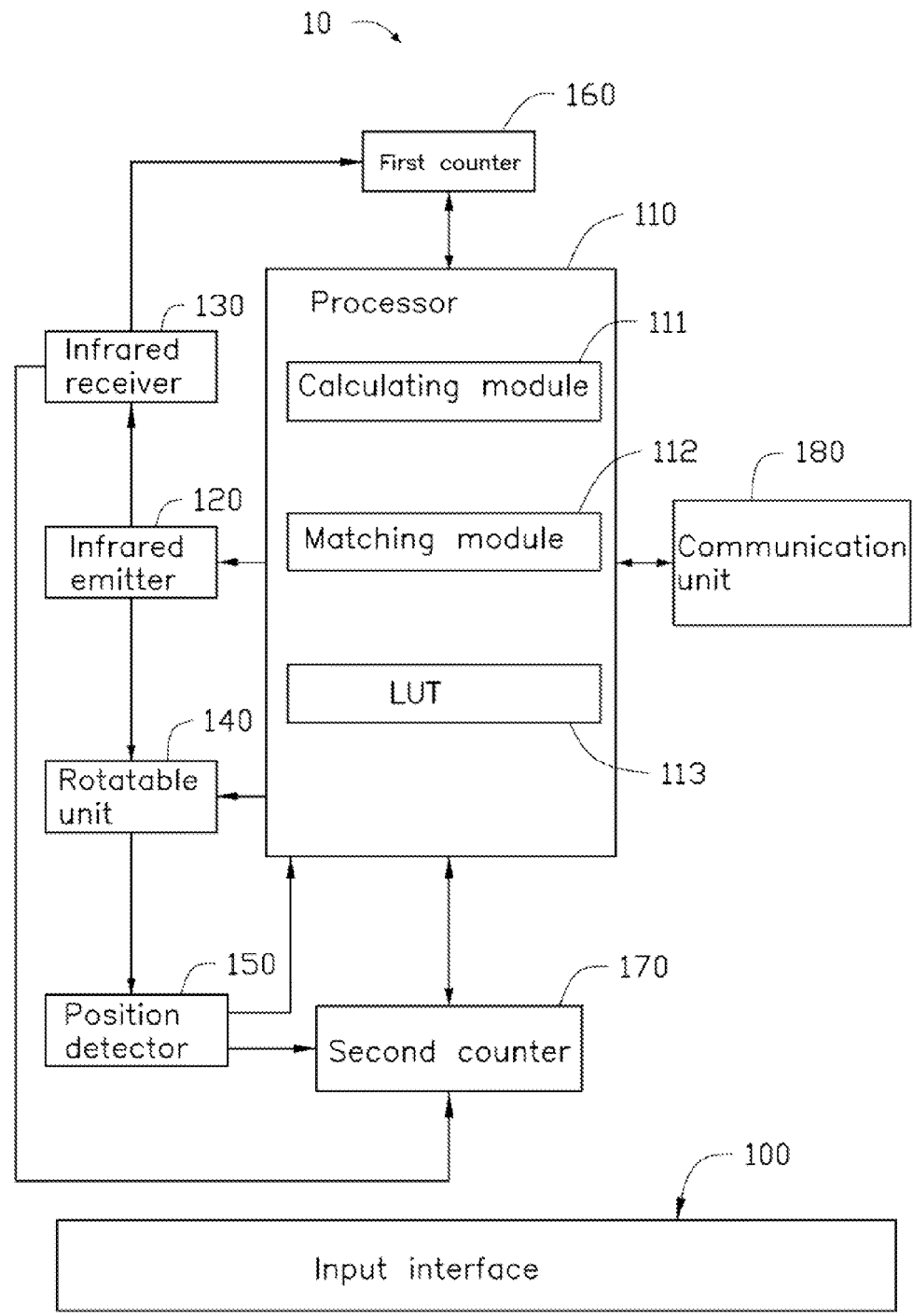
FIG. 2 is a schematic block diagram of a keyboard of FIG. 1 illustrating one embodiment of present disclosure, the keyboard including an input interface.
Figure 3:
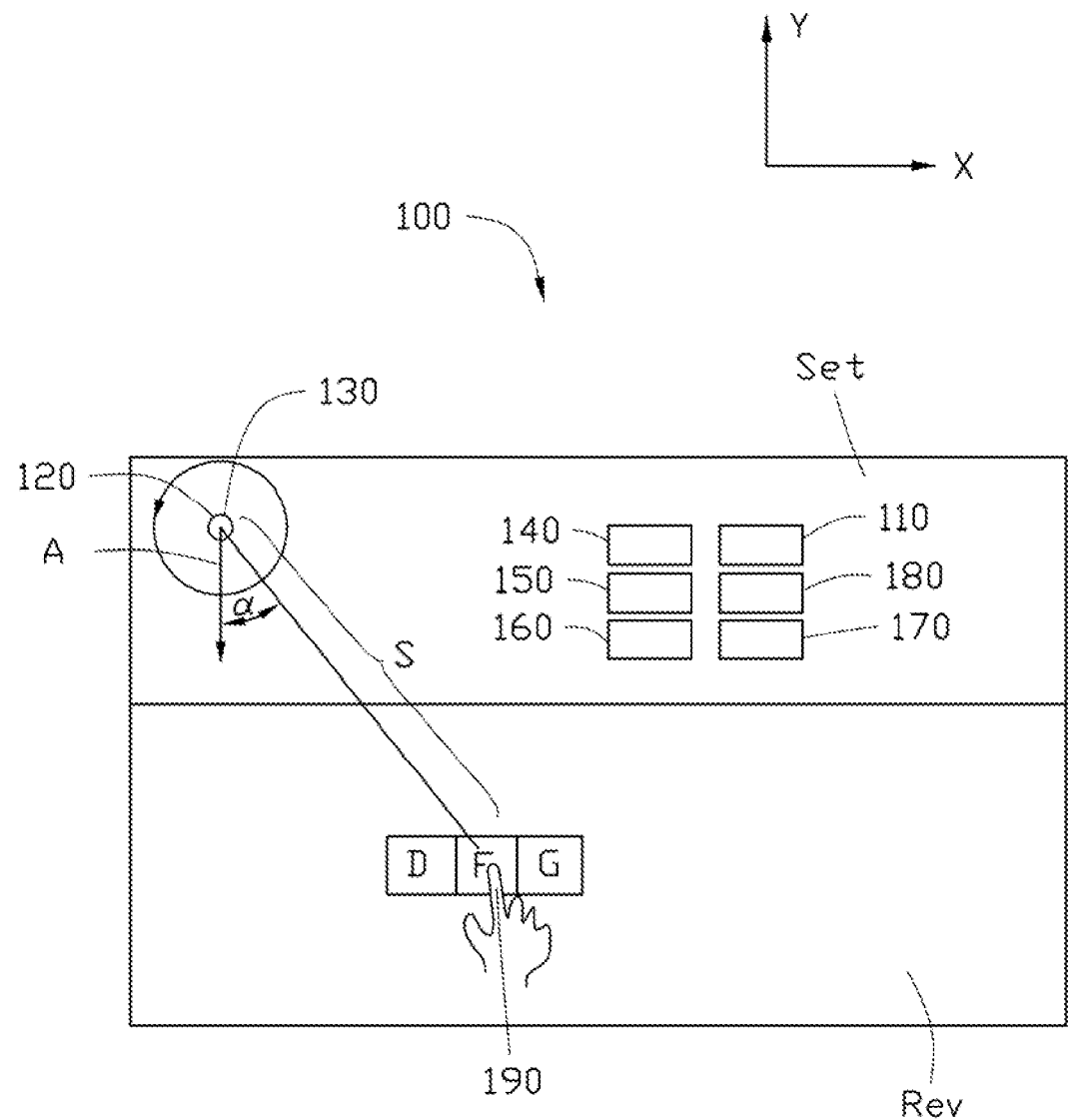
FIG. 3 is a schematic, plan view of the input interface of the keyboard of FIG. 2 illustrating one embodiment of present disclosure.

FIG. 2 is a schematic block diagram of the keyboard 10 illustrating one embodiment of present disclosure. FIG. 3 is a schematic, plan view of an input interface 100 of the keyboard 10 illustrating one embodiment of present disclosure. The keyboard 10 includes the input interface 100, a processor 110, an infrared emitter 120, an infrared receiver 130, a rotatable unit 140, a position detector 150, a first counter 160, a second counter 170 and a communication unit 180.

In one embodiment, the input interface 100 may be a physical interface such as a piece of paper or a flexible or rigid square panel with a printed surface showing a typical keyboard configuration. The input interface 100 includes an input region Rev and a function region Set as shown in FIG. 3. The input region Rev includes a plurality of images or icons (icons) representing input keys. In this embodiment, only three icons respectively representing the letters "D", "E", and "F" are shown in FIG. 3 as an example. The input key icons of the input interface 100 are configured for visibility to a user and to be touched by a user so as to achieve the input function of the keyboard 10. The function region Set is used to arrange the processor 110, the infrared emitter 120, the infrared receiver 130, the rotatable unit 140, the position detector 150, the first counter 160, the second counter 170, and the communication unit 180.

In an alternative embodiment, the physical interface may be made of materials selected from a group consisting of soft materials, elastic materials, super thin materials, and transparent materials. In other alternative embodiments, the input region Rev of the input interface 100 may be a virtual interface such as a projected image showing a typical keyboard configuration.

The processor 110 outputs a first control signal for controlling the infrared emitter 120 to emit infrared light according to a preset time interval "t", and controls the first counter 160 to start a count at each beginning of the infrared light emission. The infrared light emitted from the infrared emitter 120 may be transmitted along a top surface of the input region Rev. The processor 110 further outputs a second control signal for controlling the rotatable unit 140 to periodically rotate the infrared emitter 120 at a predetermined rotating speed "ω" from an reference direction "A" clockwise. In one embodiment, the reference direction "A" is defined to an opposite direction corresponding to a "Y" axis of a Cartesian coordinates as shown in FIG. 3. In one embodiment, the rotatable unit 140 may be a high speed motor.

The position detector 150 detects if the infrared emitter 120 is rotated to reach the reference direction "A" by the rotatable unit 140 in each rotating period. The position detector 150 informs the processor 110 to start a count of second counter 170 when the infrared emitter 120 is rotated to reach the reference direction "A" in each rotating period.

The infrared receiver 130 controls the first counter 160 and the second counter 170 to stop counting when the infrared receiver 130 receives infrared light reflected from an obstacle 190 located on one or more input key icons of the input region Rev. Each of the first counter 160 and the second counter 170 respectively records and provides a first time T1 and a second time T2 to the processor 110. The first time T1 defines a transmission time of the infrared light emitted from the infrared emitter 120 from the start of counting of the first counter 160 to the end of counting of the first counter 160 in each rotating period. The second time T2 defines a rotating time of the infrared emitter 120 from the start of counting of the second counter 170 to the end of counting of the second counter 170 in each rotating period.

In one embodiment, the obstacle 190 may be a stylus or a human finger used to touch or press the input region Rev of the input interface 100.

The processor 110 receives the first time T1 and second time T2 from the first counter 160 and the second counter 170, and calculates a position of the obstacle 190 according to the first time T1 and second time T2, the position of the infrared emitter 120 and infrared receiver 130, the transmission velocity of the infrared light V0, and the rotating speed "ω" of the infrared emitter 120. The position of the obstacle 190 indicates a touched position of the input interface 100, in other words, a touched input key icon.

In one embodiment, the processor 110 includes a calculating module 111, a matching module 112, and a look-up table (LUT) 113 as shown in FIG. 2.

In the embodiment, the infrared emitter 120 and the infrared receiver 130 are integrated into one body and fixed on a point of the function region Set as shown in FIG. 3. The infrared emitter 120 and the infrared receiver 130 protrude from the input interface 100 to facilitate the emitting and receiving of infrared light. The position of infrared emitter 120 and infrared receiver 130 are defined to be at the center (origin) of a series of concentric circles. Under this condition, the calculating module 111 calculates a distance from the obstacle 190 to the origin according to a formula of $S=\frac{1}{2}*T2*V0$. The calculating module 111 further calculates a rotated angle "α" from the reference direction "A" to a direction where the infrared receiver 130 receives the infrared light according to a formula of $\alpha=T1*\omega$. The distance "S" and the rotated angle "α" define a calculated position such as a polar coordinate (S, α) of the obstacle 190 at the input interface 100.

In one embodiment, the LUT 113 includes a plurality of reference positions and a plurality of key values. Each reference position is defined to be a predetermined area of the input interface 100 based on the position of the infrared emitter 120 and infrared receiver 130. In the embodiment, each input key icon of the input interface 100 at a reference position has a pre-defined key value. In one example, the pre-defined key value may be an ASCII code corresponding to characters or letters of the input key icon, for example, "D", "F", "G" as shown in FIG. 3. In an alternative embodiment, the LUT 113 may be stored in a storage unit selected from a group consisting of CDs, DVDs, BLU-RAY disks, Flash memory, and hard disk drives.

The matching module 112 searches the LUT 113 to find out which position the calculated positions (S, α) of the obstacle 190 are associated with, thereby establishing the pre-defined key value relating to the touched input key icon at the calculated position (S, α).

The processor 110 then sends the key value thus established to the information processing device 20 via the communication unit 180.

The communication unit 180 may be connected to the information processing device 20 by wires of PS/2 interface or wires of USB interface. In an alternative embodiment, the communication unit 180 may also communicate with the information processing device 20 via wireless communication technology, for example BLUETOOTH technology and/or WI-FI technology.

In alternative embodiments, the infrared emitter 120 may also be rotated anticlockwise.

In alternative embodiments, software may be provided and executed by the processor 110 to substitute for the first counter 160 and the second counter 170. In one embodiment, two or more counters may be employed and two or more obstacles 190 may be detected in a single rotation period.

Figure 4:
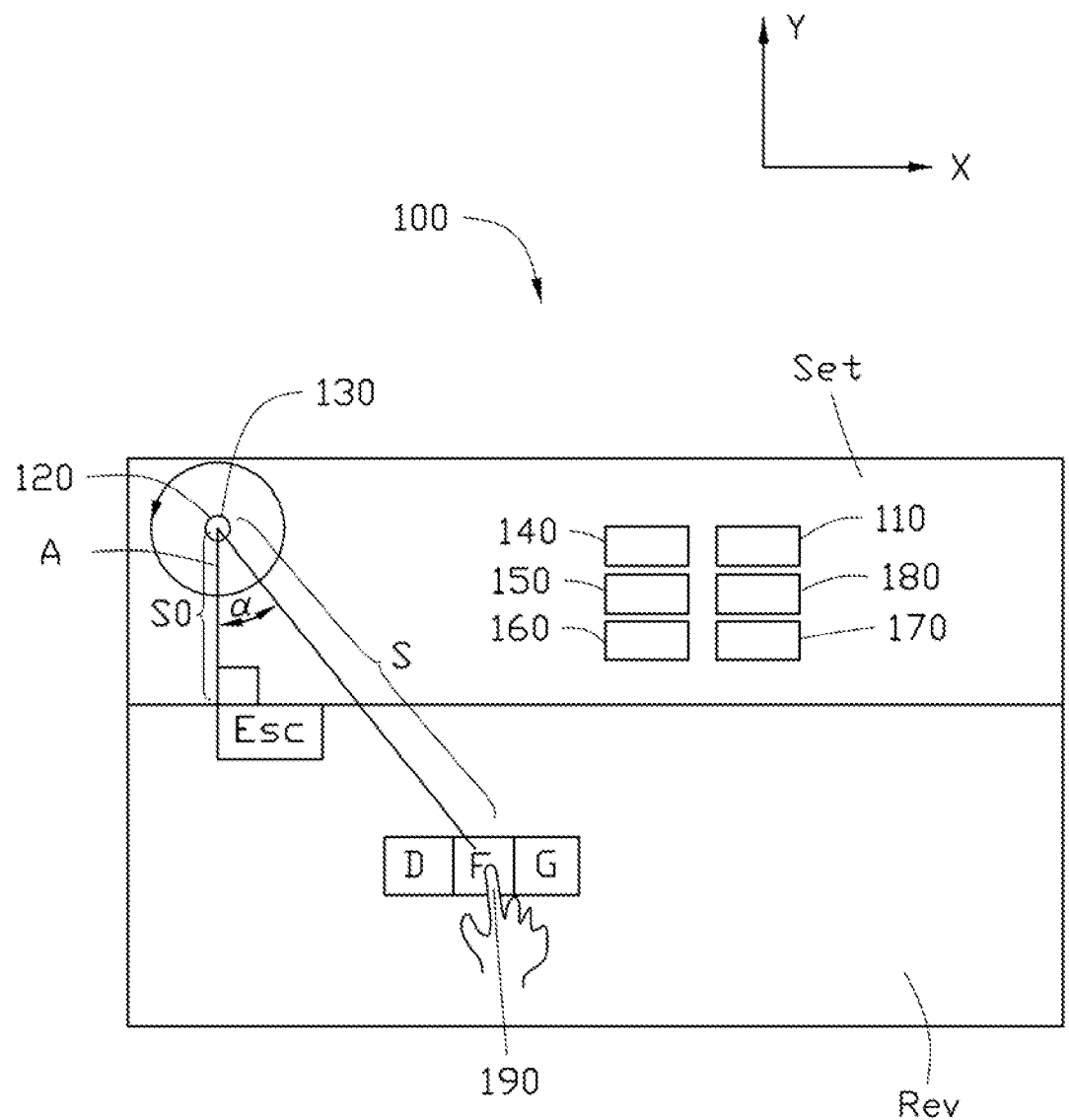
FIG. 4 is a schematic, plan view of the input interface of the keyboard of FIG. 2 illustrating another embodiment of present disclosure.

FIG. 4 is a schematic, top view of the input interface 100 illustrating another embodiment of present disclosure. The input interface 100 as shown in FIG. 4 further includes a reference mark, for example an icon representing the "ESC" function, arranged on the input region Rev. The reference mark is located on a line "A" extending from a reference point such as the position of the infrared emitter 120 and/or the infrared receiver 130. A distance from the reference mark to the reference point is S0. In this embodiment, the reference positions of the LUT 113 are defined to be distances from each input key icon of the input interface 100 to the reference mark. The distance from the obstacle 190 to the reference mark may be calculated according to the coordinate (S, α) of the obstacle 190 and the coordinate (S0, 0) of the reference mark as detailed above.

Figure 5:
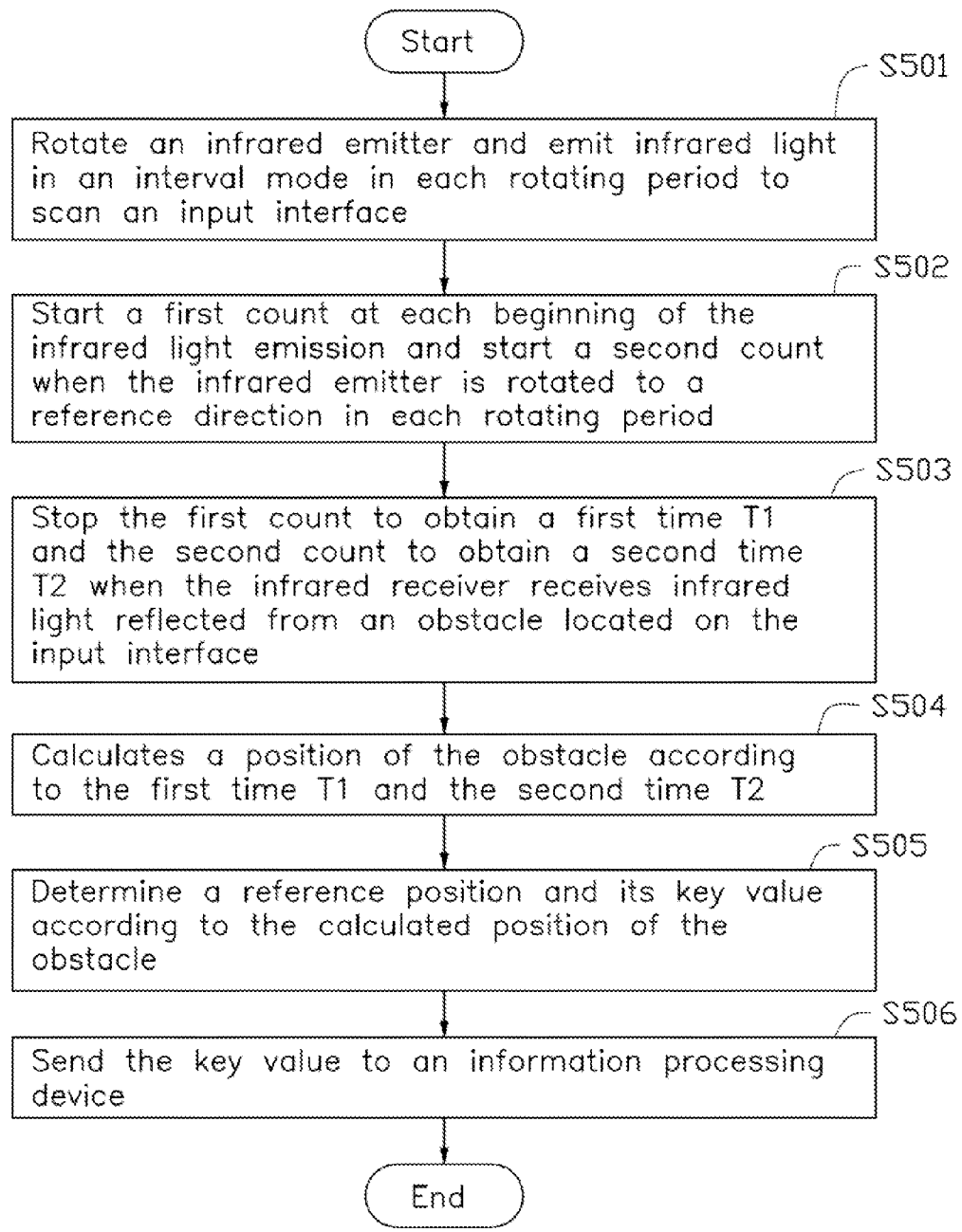
FIG. 5 is a flowchart of one embodiment showing an input method of the system of FIG. 1.

FIG. 5 is a flowchart of one embodiment showing an input method of FIG. 1. The method is carried out using the keyboard 10. Depending on the embodiment, additional steps may be added, others removed, and the ordering of the steps may be changed.

In step S501, the infrared emitter 120 emits infrared light in an interval mode according to a preset time interval "t" to scan an input interface 100 as the rotatable unit 140 periodically rotates the infrared emitter 120. The time interval "t" is a fraction of a rotating period of the infrared emitter 120.

In step S502, a first counter 160 starts a first count at each beginning of the infrared light emission. The second counter 170 starts a second count when the infrared emitter 120 is rotated to reach a reference direction "A" in each rotating period.

In step S503, when the infrared receiver 130 receives infrared light reflected from an obstacle 190 located on the input interface 100, the first counter 160 and the second counter 170 stop counting to obtain a first time T1 and a second time T2. The first time T1 defines a transmission time of the infrared light emitted from the infrared emitter 120 from the start of counting of the first counter 160 to the end of counting of the first counter 160 in each rotating period. The second time T2 defines a rotating time of the infrared emitter 120 from the start of counting of the second counter 170 to the end of counting of the second counter 170 in each rotating period.

In step S504, the processor 110 calculates a position of the obstacle 190 according to the first time T1 and the second time T2. A polar coordinate (S, α) of the obstacle 190 on the input interface 100 may be calculated as detailed above.

In step S505, the processor 110 searches the LUT 113 to determine a reference position according to the calculated position (S, α) of the obstacle 190. The processor 110 further determines and takes a key value from the LUT 113 related to the determined reference position.

In step S506, the processor 110 sends the key value to an information processing device 20 via the communication unit 180.

The keyboard 10 uses the rotated infrared emitter 120 to determine any icon touched on the input interface 100, thus a physical button configuration or scanning circuit of the input interface may be omitted, and a smaller or a thinner keyboard may be manufactured.

Even though numerous characteristics and advantages of certain inventive embodiments have been set out in the foregoing description, together with details of the structures and functions of the embodiments, the disclosure is illustrative only; and changes may be made in detail, especially in the matter of arrangement of parts within the principles of present invention to the full extent indicated by the broad general meaning of the terms in which the appended claims are expressed.

What is claimed is:

1. A keyboard comprising:
an input interface comprising a plurality of input key icons;
a rotatable infrared emitter emitting infrared light at a preset time interval to scan the input interface in each rotating period of the rotatable infrared emitter;
a first counter starting a first count at each beginning of the infrared light emission;
a second counter starting a second count when the infrared emitter rotates to reach a reference direction in each rotating period;
an infrared receiver stopping the counts of the first counter and the second counter when the infrared receiver receives infrared light reflected from an obstacle located on an input key icon of the input interface, the first counter defining a transmission time of the infrared light in each rotating period, and the second counter defining a rotating time of the infrared emitter in each rotating period; and
a processor calculating a position of the obstacle according to the transmission time, the rotating time, a rotating speed of the infrared emitter, and a position of the infrared emitter and infrared receiver.

2. The keyboard of claim 1, wherein the processor comprising a look-up table (LUT) defining a plurality of reference positions and a plurality of pre-defined key values corresponding to the reference positions.

3. The keyboard of claim 2, wherein each of the reference positions is defined to be a predetermined area of the input interface base on the positions of the infrared emitter and infrared receiver.

4. The keyboard of claim 3, wherein the processor searches the LUT to find out which reference position the calculated positions of the obstacle are associated with, thereby establishing the pre-defined key value relating to the reference position.

5. The keyboard of claim 4, further comprising a communication unit configured for transmitting the established pre-defined key value from the processor to an external information processing device.

6. The keyboard of claim 4, wherein the position of the obstacle is defined by a polar coordinate $(S, \alpha)$, where S indicates a distance from the obstacle to an origin defining by positions of the infrared emitter and the infrared receiver, and $\alpha$ indicates a rotated angle of the infrared emitter from the reference direction to a direction where the infrared receiver receives the infrared light.

7. The keyboard of claim 6, wherein the infrared emitter and the infrared receiver are integrated into one body and fixed on a point of input interface.

8. The keyboard of claim 5, wherein the communication unit communicates with the external information processing device via wireless technology.

9. The keyboard of claim 1, wherein the input interface is a physical interface without physical button or scanning circuit formed therein.

10. The keyboard of claim 1, wherein the input interface is a virtual interface.

11. The keyboard of claim 10, wherein the virtual interface is a projective image.

12. An input method comprising:
providing an input interface comprising a plurality of input key icons;
rotating an infrared emitter emitting infrared light at preset time interval to scan the input interface in each rotating period of the rotatable infrared emitter;
starting a first count by a first counter at each beginning of the infrared light emission;
starting a second count by a second counter when the infrared emitter rotates to reach a reference direction in each rotating period;
stopping the counts of the first counter and the second counter by an infrared receiver when the infrared receiver receives infrared light reflected from an obstacle located on an input key icon of the input interface, the first counter defining a transmission time of the infrared light in each rotating period, and the second counter defining a rotating time of the infrared emitter in each rotating period; and
calculating a position of the obstacle by a processor according to the transmission time, the rotating time, a rotating speed of the infrared emitter, and a position of the infrared emitter and infrared receiver.

13. The method of claim 12, further comprising a look-up table (LUT) defining a plurality of reference positions and a plurality of pre-defined key values corresponding to the reference positions.

14. The method of claim 13, wherein each of the reference positions is defined to be a predetermined area of the input interface based on the positions of the infrared emitter and infrared receiver.

15. The method of claim 14, wherein the processor searches the LUT to find out which reference position the calculated positions of the obstacle are associated with, thereby establishing the pre-defined key value relating to the reference position.

16. The method of claim 15, further comprising a communication unit configured for transmitting the established pre-defined key value from the processor to an external information processing device.

17. The method of claim 15, wherein the position of the obstacle is defined by a polar coordinate $(S, \alpha)$, where S indicates a distance from the obstacle to an origin defining by positions of the infrared emitter and the infrared receiver, and $\alpha$ indicates a rotated angle of the infrared emitter from the reference direction to a direction where the infrared receiver receives the infrared light.

18. The method of claim 17, wherein the infrared emitter and the infrared receiver are integrated into one body and fixed on a point of input interface.

19. The method of claim 16, wherein the communication unit communicates with the external information processing device via wireless technology.

20. The method of claim 19, wherein the input interface is a physical interface without physical button or scanning circuit formed therein.

* * * * *